(12) United States Patent
Yang et al.

(10) Patent No.: US 9,798,680 B2
(45) Date of Patent: Oct. 24, 2017

(54) POLICY CONTROL METHOD AND APPARATUS FOR TERMINAL PERIPHERAL

(71) Applicant: ZTE Corporation, Shenzhen (CN)

(72) Inventors: Kun Yang, Shenzhen (CN); Hao Wu, Shenzhen (CN)

(73) Assignee: XI'AN ZTE NEW SOFTWARE COMPANY LIMITED, Xi'An (CN)

( * ) Notice: Subject to any disclaimer, the term of this patent is extended or adjusted under 35 U.S.C. 154(b) by 0 days.

(21) Appl. No.: 14/433,900

(22) PCT Filed: Jul. 29, 2013

(86) PCT No.: PCT/CN2013/080306
§ 371 (c)(1),
(2) Date: Apr. 7, 2015

(87) PCT Pub. No.: WO2013/174346
PCT Pub. Date: Nov. 28, 2013

(65) Prior Publication Data
US 2015/0254190 A1 Sep. 10, 2015

(30) Foreign Application Priority Data
Oct. 26, 2012 (CN) .......................... 2012 1 0417138

(51) Int. Cl.
*G06F 3/00* (2006.01)
*G06F 13/10* (2006.01)
(Continued)

(52) U.S. Cl.
CPC .......... *G06F 13/10* (2013.01); *G06F 9/44505* (2013.01); *H04L 12/6418* (2013.01);
(Continued)

(58) Field of Classification Search
CPC .................................................. G06F 3/04817
See application file for complete search history.

(56) References Cited

U.S. PATENT DOCUMENTS

| | | | |
|---|---|---|---|
| 2011/0213871 A1 | 9/2011 | Digirolamo et al. | |
| 2013/0203394 A1* | 8/2013 | Dong .................... | H04W 4/005 455/414.1 |
| 2013/0244695 A1* | 9/2013 | Park ..................... | H04W 4/005 455/456.1 |

FOREIGN PATENT DOCUMENTS

| | | |
|---|---|---|
| CN | 102056267 A | 5/2011 |
| CN | 102244898 A | 11/2011 |

(Continued)

OTHER PUBLICATIONS

International Search Report for corresponding application PCT/CN2013/080306 filed Jul. 29, 2013; Mail date Oct. 24, 2013.
(Continued)

*Primary Examiner* — Henry Tsai
*Assistant Examiner* — Juanito Borromeo
(74) *Attorney, Agent, or Firm* — Cantor Colburn LLP (57) ABSTRACT

Provided are a policy control method and device for one or more terminal peripherals. The method includes: an M2M gateway executing one or more operations for one or more terminal peripherals according to a transaction trigger condition in policy definition, wherein the one or more operations for the one or more terminal peripherals are one or more operations corresponding to the transaction trigger condition in the policy definition. The solution solves the technical problem in the related art that it is impossible to implement control for one or more terminal peripherals through the M2M gateway according to the policy definition, which implements policy control of one or more terminal peripherals through the M2M gateway and improves the intelligent degree of an M2M system.

14 Claims, 5 Drawing Sheets

(51) Int. Cl.
*H04W 4/00* (2009.01)
*H04L 29/02* (2006.01)
*G06F 9/445* (2006.01)
*H04W 88/16* (2009.01)
*H04L 12/24* (2006.01)
*H04L 12/64* (2006.01)
*H04L 29/06* (2006.01)
*H04L 12/66* (2006.01)
*H04L 29/08* (2006.01)
*H04L 29/14* (2006.01)

(52) U.S. Cl.
CPC .......... *H04L 29/02* (2013.01); *H04L 41/0893* (2013.01); *H04W 4/005* (2013.01); *H04W 88/16* (2013.01); *H04L 12/66* (2013.01); *H04L 65/102* (2013.01); *H04L 67/04* (2013.01); *H04L 67/12* (2013.01); *H04L 69/08* (2013.01); *H04L 69/26* (2013.01); *H04L 69/28* (2013.01); *H04L 69/40* (2013.01)

(56) References Cited

FOREIGN PATENT DOCUMENTS

| | | |
|---|---|---|
| CN | 102413508 A | 4/2012 |
| EP | 2957814 A1 | 12/2015 |
| WO | 2012009929 A1 | 1/2012 |

OTHER PUBLICATIONS

European Search Report No. 13793308.1-1853/29113970 PCT/CN2013080306; Dated October 22, 2015; pp. 11.

* cited by examiner

An M2M executing one or more operations for one or more terminal peripherals according to a transaction trigger condition in policy definition, wherein the one or more operations for one or more terminal peripherals are one or more operations corresponding to the transaction trigger condition in the policy definition — S102

Fig. 1

An M2M gateway determines whether the transaction trigger condition is currently satisfied — S202

In the case of judging that the transaction trigger condition is satisfied, the M2M gateway determines one or more operations corresponding to the transaction trigger condition in the policy definition, wherein the one or more corresponding operations serve as one or more operations to be executed for the one or more terminal peripherals — S204

The M2M gateway executes for the one or more terminal peripherals the one or more operations determined to be executed for the one or more terminal peripherals — S206

POLICY CONTROL METHOD AND APPARATUS FOR TERMINAL PERIPHERAL

TECHNICAL FIELD

The disclosure relates to the field of communications, and in particular to a policy control method and apparatus for one or more terminal peripherals.

BACKGROUND

A communication system architecture between a machine and a machine/man (Machine-to-Machine/Man, referred to as M2M) may be divided into: an M2M application layer, an M2M service capability layer, a communication network layer, a M2M terminal and perception extension layer as well as a management supporting system.

The M2M terminal and perception extension layer divides M2M terminal peripherals into two types according to capabilities of the M2M terminal peripherals. One type of M2M terminal is an M2M terminal with the capability of communicating with an M2M communication network. This type of M2M terminal is capable of directly accessing an M2M service platform through a communication network, interacting with the platform to complete registration, certification and authentication of the terminal, and providing perception information required by application. This type of M2M terminal is mainly used for performing service interaction between the M2M service platform and an application, and can receive management for the terminal peripheral. The other type of M2M terminal is an M2M gateway with the capability of communicating with an M2M communication network and an M2M stub network. Besides accessing the M2M stub network and perception device to a network, the M2M gateway also can receive management information for M2M stub network nodes and perform protocol conversion between the M2M stub network and the M2M communication network.

The terminal peripherals are terminals, like sensors performing environment perception and data acquisition. The resources of the terminal peripherals, like processing capabilities, storage capabilities and power sources are limited, and only short distance communications can be performed. A single terminal of this type is called a terminal peripheral, and a network constituted of multiple terminal nodes of this type is called an M2M stub network.

The M2M stub network is constituted of nodes, like sensors, with capabilities of information acquisition, simple processing and communication. The purpose of the M2M stub network is to cooperatively perceive and acquire relevant information about monitored objects within a network coverage area, and send the monitored data to the M2M gateway. The M2M gateway transmits the perception data through a communication network to the M2M service platform and application for analysing and processing the perception data.

A terminal peripheral, as a single device like a sensor with an environment perception function, can send perceived data to the M2M service platform or M2M application through the M2M gateway or M2M terminal, and also can receive downlink control intended for the terminal peripheral by the M2M application or M2M service platform.

Being limited by factors, like processing capability, storage capability and power sources, the M2M stub network and the terminal peripheral cannot directly communication with a communication network, but needs to access the communication network through the M2M gateway. The M2M gateway can perform protocol conversion between the M2M stub network and an up layer network. Besides converging and forwarding data information acquired by the M2M stub network and the terminal peripheral, the M2M gateway also can receive control information from the M2M service platform and manage the M2M stub network and the terminal peripheral.

However, there in no effective mechanism in the related art for realizing policy control for the terminal peripheral through the M2M gateway, thereby causing lower intelligent degree of M2M network control.

Aiming at the above-mentioned problem, no effective solution has been presented at present.

SUMMARY

The embodiments of the disclosure provide a policy control method and apparatus for one or more terminal peripherals so as to at least solve the technical problem in the related art that it is impossible to implement control for one or more terminal peripherals through the M2M gateway according to the policy definition.

According to one aspect of the embodiments of the disclosure, a policy control method for one or more terminal peripherals is provided. In the method, an M2M gateway executes one or more operations for one or more terminal peripherals according to a transaction trigger condition in policy definition, wherein the one or more operations for the one or more terminal peripherals are one or more operations corresponding to the transaction trigger condition in the policy definition.

In an example embodiment, the M2M gateway executing the one or more operations for the one or more terminal peripherals according to the transaction trigger condition in the policy definition includes that: the M2M gateway determines whether the transaction trigger condition is currently satisfied; in the case of judging that the transaction trigger condition is satisfied, the M2M gateway determines one or more operations corresponding to the transaction trigger condition in the policy definition, wherein the one or more corresponding operations serve as the one or more operations to be executed for the one or more terminal peripherals; and the M2M gateway executes for the one or more terminal peripherals the one or more operations determined to be executed for the one or more terminal peripherals.

In an example embodiment, the transaction trigger condition is one or more condition values required to be satisfied when the M2M gateway executes the one or more operations for the one or more terminal peripherals, wherein the one or more condition values include at least one of the following: a system time of the M2M gateway or a time value of a timer, data values of monitored data of the one or more terminal peripherals, and one or more state values of one or more device operation states of the one or more terminal peripherals.

In an example embodiment, executing the one or more operations for the one or more terminal peripherals includes: the M2M gateway determines whether currently there are one or more operations belonging to the same type as the one or more operations to be executed for the one or more terminal peripherals; if currently there is not any operation belonging to the same type, then the M2M gateway stores the one or more operations to be executed for the one or more terminal peripherals, and issues the one or more operations to be executed for the one or more terminal peripherals to the one or more terminal peripherals; and if currently there are one or more operations belonging to the same type, then the M2M gateway processes the one or more operations to be executed for the one or more terminal peripherals according to priorities among operations.

In an example embodiment, the M2M gateway processing the one or more operations to be executed for the one or more terminal peripherals according to the priorities among operations includes: in the case that the priority of the one or more operations belonging to the same type as the one or more operations to be executed for the one or more terminal peripherals is not higher than the priority of the one or more operations to be executed for the one or more terminal peripherals, the M2M gateway uses the one or more operations to be executed for the one or more terminal peripherals to replace the one or more operations belonging to the same type, otherwise discards the one or more operations to be executed for the one or more terminal peripherals.

In an example embodiment, executing the one or more operations for the one or more terminal peripherals includes: the M2M gateway issues the one or more operations to be executed for the one or more terminal peripherals to the one or more terminal peripherals; the M2M gateway receives operation execution information fed back by the one or more terminal peripherals; and the M2M gateway processes the one or more operations to be executed for the one or more terminal peripherals according to the operation execution information.

In an example embodiment, the operation execution information includes at least one of the following: terminal peripheral identification, execution success indication, a state value after executing one or more operations successfully, execution failure indication and a reason value for the operation execution failure.

In an example embodiment, the M2M gateway processing the one or more operations to be executed for the one or more terminal peripherals according to the operation execution information includes: in the case that the operation execution information indicates the operation execution success, the M2M gateway deletes the stored one or more operations to be executed for the one or more terminal peripherals, and records operation execution information about the one or more operations executed for the one or more terminal peripherals.

In an example embodiment, the M2M gateway processing the one or more operations to be executed for the one or more terminal peripherals according to the operation execution information includes: in the case that the operation execution information indicates the operation execution failure, the M2M gateway judges whether the times of executing the one or more operations for the one or more terminal peripherals reach a preset times threshold value; if not reached, then the M2M gateway again issues the one or more operations to be executed for the one or more terminal peripherals to the one or more terminal peripherals, and if reached, then the M2M gateway deletes the stored one or more operations to be executed for the one or more terminal peripherals, and records operation execution information about the one or more operations executed for the one or more terminal peripherals.

In an example embodiment, before the M2M gateway again issuing the one or more operations to be executed for the one or more terminal peripherals to the one or more terminal peripherals, the method further includes: the M2M gateway judges whether the duration for storing the one or more operations to be executed for the one or more terminal peripherals in the M2M gateway exceeds a preset valid time value, if the duration does not exceed the preset valid time value, then the M2M gateway again issues the one or more operations to be executed for the one or more terminal peripherals to the one or more terminal peripherals.

In an example embodiment, the policy definition is issued to the M2M gateway by an M2M application or M2M service platform, and/or is locally configured at the M2M gateway.

In an example embodiment, in the case that the policy definition is issued to the M2M gateway by the M2M application or M2M service platform, after executing the one or more operations for the one or more terminal peripherals, the method further includes: the M2M gateway reports, to the M2M application or M2M service platform, indication information about whether the one or more operations for the one or more terminal peripherals are executed successfully; and/or in the case that the policy definition is locally configured at the M2M gateway, after executing the one or more operations for the one or more terminal peripherals, the method further includes: the M2M gateway reports, to a user, indication information about whether the one or more operations for the one or more terminal peripherals are executed successfully.

In an example embodiment, the one or more terminal peripherals is one terminal peripheral or multiple terminal peripherals, and the multiple terminal peripherals constitute a terminal peripheral group.

According to another aspect of the embodiments of the disclosure, a policy control apparatus for one or more terminal peripherals is provided, which is located in an M2M gateway, including: an execution element, configured to execute one or more operations for one or more terminal peripherals according to a transaction trigger condition in policy definition, wherein the one or more operations for one or more terminal peripherals are one or more operations corresponding to the transaction trigger condition in the policy definition.

In an example embodiment, the execution element includes: a first determination component, configured to determine whether the transaction trigger condition is currently satisfied; a second determination component, configured to determine one or more operations corresponding to the transaction trigger condition in the policy definition in the case of judging that the transaction trigger condition is satisfied, wherein the one or more corresponding operations serve as the one or more operations to be executed for the one or more terminal peripherals; and an execution component, configured to execute for the one or more terminal peripherals the one or more operations determined to be executed for the one or more terminal peripherals.

In an example embodiment, the execution element includes: a third determination component, configured to determine whether currently there are one or more operations belonging to the same type as the one or more operations to be executed for the one or more terminal peripherals; a first issuing component, configured to, in the case of determining that currently there is no operation belonging to the same type as the one or more operations to be executed for the one or more terminal peripherals, store the one or more operations to be executed for the one or more terminal peripherals, and issue to the one or more terminal peripherals the one or more operations to be executed for the one or more terminal peripherals; and a first processing component, configured to, in the case of determining that currently there are one or more operations belonging to the same type as the one or more operations to be executed for the one or more terminal peripherals, process the one or more operations to be executed for the one or more terminal peripherals according to priorities among operations.

In an example embodiment, the first processing component is further configured to, in the case that the priority of the one or more operations belonging to the same type as the one or more operations to be executed for the one or more terminal peripherals is not higher than the priority of the one or more operations to be executed for the one or more terminal peripherals, use the one or more operations to be executed for the one or more terminal peripherals to replace the one or more operations belonging to the same type by the M2M gateway, otherwise discard the one or more operations to be executed for one or more terminal peripherals.

In an example embodiment, the execution element includes: a second issuing component, configured to issue the one or more operations to be executed for the one or more terminal peripherals to the one or more terminal peripherals; a reception component, configured to receive operation execution information fed back by the one or more terminal peripherals; and a second processing component, configured to process the one or more operations to be executed for the one or more terminal peripherals according to the operation execution information.

In an example embodiment, the second processing component includes: a judgement sub-component, configured to, in the case that the operation execution information indicates the operation execution failure, judge whether the times of executing the one or more operations for the one or more terminal peripherals reach a preset times threshold value and/or whether the duration for storing the one or more operations to be executed for the one or more terminal peripherals in the M2M gateway exceeds a preset valid time value; a retransmission sub-component, configured to, in the case of not reaching the preset times threshold value and not exceeding the preset valid time value, again issue the one or more operations to be executed for the one or more terminal peripherals to the one or more terminal peripherals; and a first deletion sub-component, configured to, in the case of reaching the preset times threshold value and/or exceeding the preset valid time value, delete the stored one or more operations to be executed for the one or more terminal peripherals, and record operation execution information about the one or more operations executed for the one or more terminal peripherals.

In an example embodiment, the second processing sub-component includes: a second deletion sub-component, configured to, in the case that the operation execution information indicates the operation execution success, delete the stored one or more operations to be executed for the one or more terminal peripherals, and record operation execution information about the one or more operations executed for the one or more terminal peripherals.

In the embodiments of the disclosure, the M2M gateway executes the one or more operations for the one or more terminal peripherals according to preset policy definition so as to implement policy control for the one or more terminal peripherals. Multiple sets of policy definition may be stored, and each set of policy definition has a transaction trigger condition of the policy, and one or more operations which are to be executed for the one or more terminal peripherals when the trigger condition of the policy is satisfied, as well as one or more terminal peripherals the policy definition can be applied. The manner effectively solves the technical problem in the related art that it is impossible to implement control for one or more terminal peripherals through the M2M gateway according to the policy definition, which implements policy control of one or more terminal peripherals through the M2M gateway and improves the intelligent degree of an M2M system.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DESCRIPTION OF EMBODIMENTS

The example embodiments are described in conjunction with the drawings as follows. It should be noted that the embodiments and the characteristics of the embodiments can be combined with each other if no conflict is caused.

Figure 1:
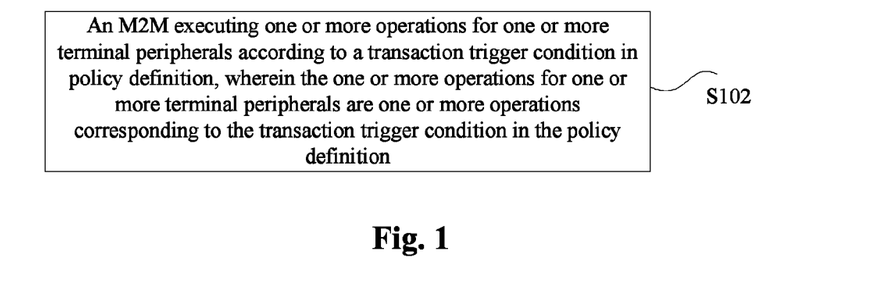
FIG. 1 is an example flowchart of a policy control method for one or more terminal peripherals according to an embodiment of the disclosure.

An embodiment of the disclosure provides an example policy control method for one or more terminal peripherals. As shown in FIG. 1, the method includes the following Step S102.

In Step S102, an M2M gateway executes one or more operations for one or more terminal peripherals according to a transaction trigger condition in policy definition, wherein the one or more operations executed for the one or more terminal peripherals are one or more operations corresponding to the above-mentioned transaction trigger condition in the policy definition.

In an example embodiment, the "transaction" in the above-mentioned transaction trigger condition is understood as one group of association operations for single or multiple terminal peripherals, or at least one group association operation for one or more terminal peripheral groups. If each contained operation is successfully completed, then the transaction is executed successfully. If any one operation therein is failed, then the transaction is executed unsuccessfully. For example, if the transaction corresponds to one group of terminal peripherals, then if one terminal peripheral in the multiple terminal peripherals of this group is executed unsuccessfully, then the transaction is also executed unsuccessfully.

That is, in above-mentioned example embodiment, the M2M gateway executes the one or more operations for the one or more terminal peripherals according to preset policy definition so as to implement policy control for the one or more terminal peripherals. Multiple sets of policy definition may be stored, and each set of policy definition has a transaction trigger condition of the policy, and one or more operations which are to be executed for the one or more terminals when the trigger condition of the policy is satisfied, as well as one or more terminal peripherals the policy definition can be applied. The above-mentioned manner effectively solves the technical problem in the related art that it is impossible to implement control for one or more terminal peripherals through the M2M gateway according to the policy definition, which implements policy control of one or more terminal peripherals through the M2M gateway and improves the intelligent degree of an M2M system.

Figure 2:
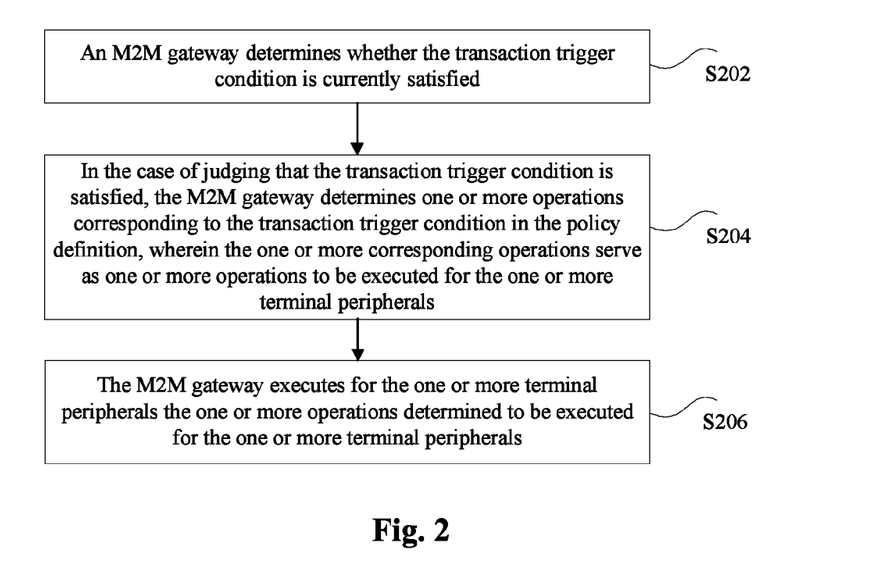
FIG. 2 is an example flowchart of executing one or more operations for the one or more terminal peripherals according to an embodiment of the disclosure.

Specifically, the flow of executing the one or more operations for the one or more terminal peripherals according to the transaction trigger condition in the policy definition may be as shown in FIG. 2, including the following Steps S202 to S206.

In Step S202, an M2M gateway determines whether the transaction trigger condition is currently satisfied.

In Step S204, in the case of judging that the transaction trigger condition is satisfied, the M2M gateway determines one or more operations corresponding to the transaction trigger condition in the policy definition, wherein the one or more corresponding operations serve as the one or more operations to be executed for one or more terminal peripherals.

In Step S206, the M2M gateway executes for the one or more terminal peripherals the one or more operations determined to be executed for the one or more terminal peripherals.

The above-mentioned transaction trigger condition means one or more condition values required to be satisfied when the above-mentioned M2M gateway executes the one or more operations for the one or more terminal peripherals. The above-mentioned condition value may include but not limited to at least one of the following: a system time of the M2M gateway or a time value of a timer, data values of monitored data of the one or more terminal peripherals, and one or more state values of one or more device operation states of the one or more terminal peripherals.

Figure 3:
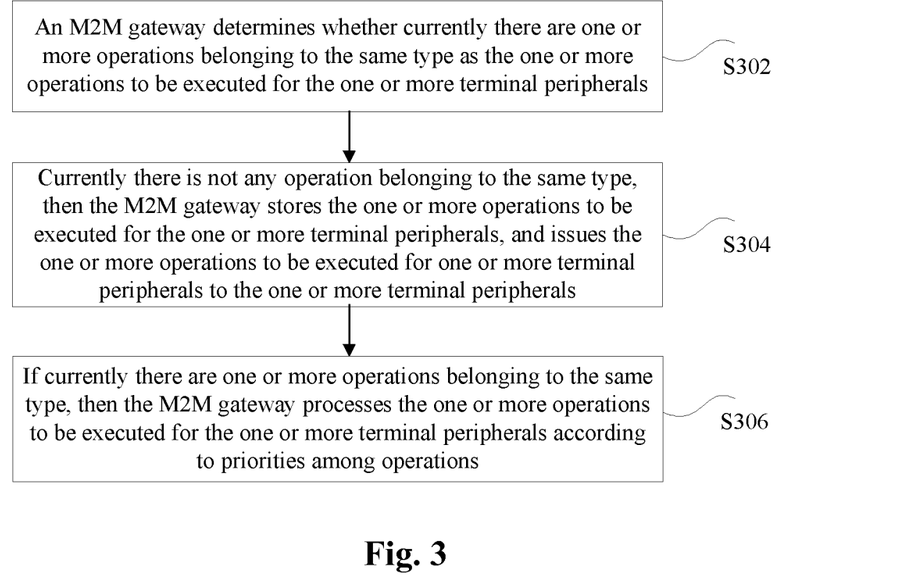
FIG. 3 is another example flowchart for executing the one or more operations for the one or more terminal peripherals according to an embodiment of the disclosure.

Considering that there may exist a situation that the system is currently executing the same type of operation or operations for the one or more terminal peripherals, before executing the determined one or more operations, it may be determined firstly whether the system has one or more operations belonging to the same type as the determined one or more operations, and one or more corresponding operations are then executed according the determined result. For example, as shown in FIG. 3, executing the one or more operations for the one or more terminal peripherals may include the following Steps S302 to S306.

In Step S302, an M2M gateway determines whether currently there are one or more operations belonging to the same type as the one or more operations to be executed for the one or more terminal peripherals.

In Step S304, if currently there is not any operation belonging to the same type, the M2M gateway stores the one or more operations to be executed for the one or more terminal peripherals, and issues the one or more operations to be executed for the one or more terminal peripherals to the one or more terminal peripherals.

In Step S306, if currently there are one or more operations belonging to the same type, then the M2M gateway processes the one or more operations to be executed for the one or more terminal peripherals according to priorities among operations. That is, the priority of one or more current existing operations in the system is compared with the priority of the one or more determined operations.

For example, if the priority of the one or more operations belonging to the same type as the above-mentioned one or more operations to be executed for the one or more terminal peripherals is not higher than the priority of the one or more operations to be executed for the one or more terminal peripherals, that is, the priority of the one or more operations in the policy definition is higher than or equal to the priority of the one or more operations belonging to the same type, then the M2M gateway uses the one or more operations to be executed for the one or more terminal peripherals to replace the one or more operations belonging to the same type, otherwise the M2M gateway discards the one or more operations to be executed for the one or more terminal peripherals.

Figure 4:
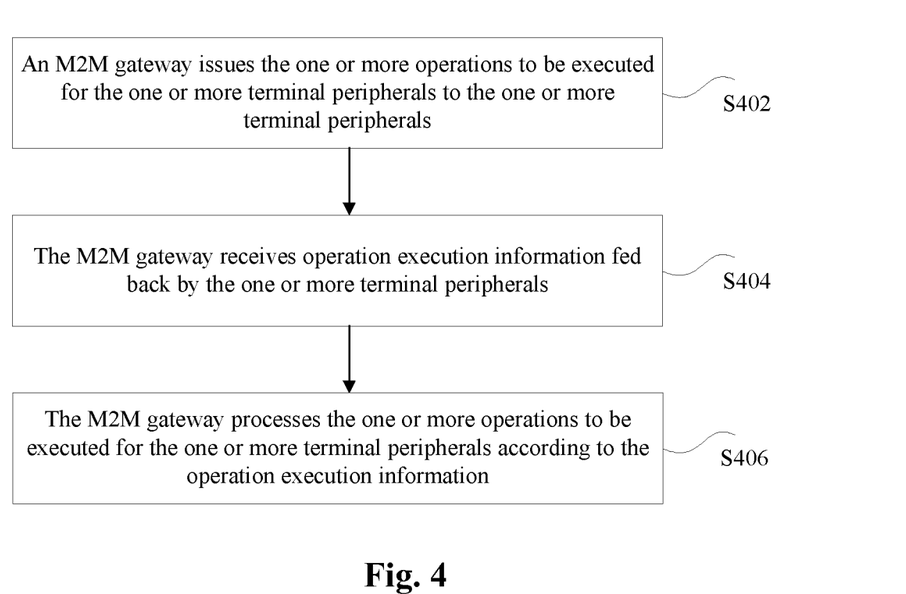
FIG. 4 is still another example flowchart for executing the one or more operations for the one or more terminal peripherals according to an embodiment of the disclosure.

The M2M gateway also can determine a specific processing manner for the one or more operations according to operation execution information fed back by one or more terminal peripherals. In one example embodiment, as shown in FIG. 4, executing the one or more operations for the one or more terminal peripherals includes the following Steps S402 to S406.

In Step S402, an M2M gateway issues the one or more operations to be executed for the one or more terminal peripherals to the one or more terminal peripherals.

In Step 404, the M2M gateway receives operation execution information fed back by the one or more terminal peripherals.

In Step S406, the M2M gateway processes the one or more operations to be executed for the one or more terminal peripherals according to the operation execution information.

In an example embodiment, the above-mentioned operation execution information may include but not limited to at least one of the following: terminal peripheral identification, execution success indication, a state value after executing one or more operations successfully, execution failure indication and a reason value for the operation execution failure.

In an example embodiment, in the case that the operation execution information indicates operation execution success, the M2M gateway may delete the stored one or more operations to be executed for the one or more terminal peripherals, and record operation execution information about the one or more operations executed for the one or more terminal peripherals.

Retransmission times may be preset for the one or more operations for the one or more terminal peripherals, that is, the number of times of retransmission cannot exceed a preset number of times. In one example embodiment, the M2M gateway processing the one or more operations to be executed for the one or more terminal peripherals according to the operation execution information may include: in the case that the operation execution information indicates operation execution failure, the M2M gateway judges whether the times of executing the one or more operations for the one or more terminal peripherals reach a preset times threshold value; if not reached, then the M2M gateway again issues the one or more operations to be executed for the one or more terminal peripherals to the one or more terminal peripherals, and if reached, then the M2M gateway deletes the stored one or more operations to be executed for the one or more terminal peripherals, and records operation execution information about the one or more operations executed for the one or more terminal peripherals. That is, the one or more operations are only retransmitted when determining that the number of times of retransmission does not reach a preset maximal number of times of retransmission.

A timer also may be set for each operation, and the timer is started at the moment when issuing the one or more operations to the one or more terminal peripherals. The retransmission of the one or more operations is only performed when the timer has not reached a preset valid time value. In one example embodiment, before the M2M gateway again issues the one or more operations to be executed for the one or more terminal peripherals to the one or more terminal peripherals, the above-mentioned method further may include: the M2M gateway judges whether the duration for storing the one or more operations to be executed for the one or more terminal peripherals in the M2M gateway exceeds a preset valid time value, if the duration does not exceed the preset valid time value, then the M2M gateway again issues the one or more operations to be executed for the one or more terminal peripherals to the one or more terminal peripherals.

In the above-mentioned each example embodiment, the policy definition may be issued to the M2M gateway by an M2M application or M2M service platform, and/or also may be locally configured at the M2M gateway.

Correspondingly, if the policy definition is issued to the M2M gateway by the M2M application or M2M service platform, after executing the one or more operations for the one or more terminal peripherals, the M2M gateway reports to the M2M application or M2M service platform indication information about whether the one or more operations for the one or more terminal peripherals are executed successfully. If the policy definition is locally configured at the M2M gateway, then after executing the one or more operations for the one or more terminal peripherals, the M2M gateway reports to a user indication information about whether the one or more operations for the one or more terminal peripherals are executed successfully.

In an example embodiment, there may be multiple terminal peripherals, and the multiple terminal peripherals constitute a terminal peripheral group.

Figure 5:
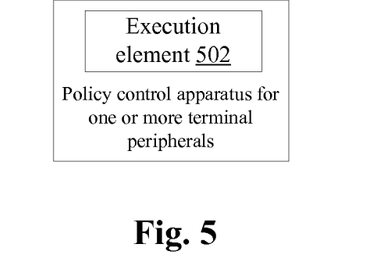
FIG. 5 is an example structural diagram of a policy control apparatus for one or more terminal peripherals according to an embodiment of the disclosure.

An embodiment also provides a policy control apparatus for one or more terminal peripherals, which is located in an M2M gateway. The apparatus is used to implement the above-mentioned embodiments and example embodiments, and there is no further description for what has been described already. As used in the following, the term "element" or "component" is a combination of software and hardware which can implement predetermined functions. Although the device described in the following embodiment may be implemented by software, the realization by hardware or the combination of software and hardware is also possible and conceived. FIG. 5 is an example structural diagram of a policy control apparatus for one or more terminal peripherals according to an embodiment of the disclosure. As shown in FIG. 5, an execution element 502 is included, and the structure is described below.

The execution element 502 is configured to execute one or more operations for the one or more terminal peripherals according to a transaction trigger condition in policy definition, wherein the one or more operations executed for one or more terminal peripherals are one or more operations corresponding to the transaction trigger condition in the policy definition.

Figure 6:
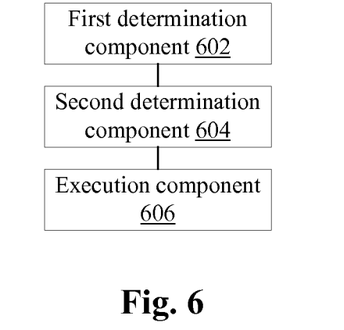
FIG. 6 is an example structural diagram of an execution element according to an embodiment of the disclosure.

In one example embodiment, as shown in FIG. 6, the above-mentioned execution element includes: a first determination component 602, configured to determine whether the transaction trigger condition is currently satisfied; a second determination component 604, coupled to the first determination component 602 and configured to determine one or more operations corresponding to the transaction trigger condition in the policy definition in the case of judging that the above-mentioned transaction trigger condition is satisfied, wherein the one or more corresponding operations serve as the one or more operations to be executed for the one or more terminal peripherals; and an execution component 606, coupled to the second determination component 604 and configured to execute for the one or more terminal peripherals the one or more operations determined to be executed for the one or more terminal peripherals.

Figure 7:
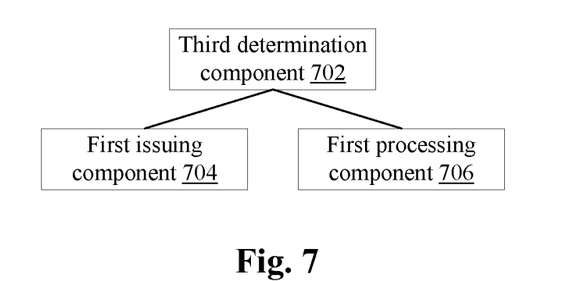
FIG. 7 is another example structural diagram of an execution element according to an embodiment of the disclosure.

In one embodiment, as shown in FIG. 7, the above-mentioned execution element includes: a third determination component 702, configured to determine whether currently there are one or more operations belonging to the same type as the one or more operations to be executed for the one or more terminal peripherals; a first issuing component 704, coupled to the third determination component 702 and configured to, in the case of determining that currently there is no operation belonging to the same type as the one or more operations to be executed for the one or more terminal peripherals, store the one or more operations to be executed for the one or more terminal peripherals, and issue to the one or more terminal peripherals the one or more operations to be executed for the one or more terminal peripherals; and a first processing component 706, coupled to the third determination component 702 and configured to, in the case of determining that currently there are one or more operations belonging to the same type as the above-mentioned one or more operations to be executed for the one or more terminal peripherals, process the one or more operations to be executed for the one or more terminal peripherals according to priorities among operations.

In one embodiment, the first processing component is further configured to, in the case that the priority of the one or more operations belonging to the same type as the one or more operations to be executed for the one or more terminal peripherals is not higher than or equal to the priority of the one or more operations to be executed for the one or more terminal peripherals, use the one or more operations to be executed for the one or more terminal peripherals to replace the one or more operations belonging to the same type by the M2M gateway, otherwise discard the one or more operations to be executed for the one or more terminal peripherals.

In one example embodiment, the above-mentioned execution element includes: a second issuing component, configured to issue the one or more operations to be executed for the one or more terminal peripherals to the above-mentioned one or more terminal peripherals; a reception component, configured to receive operation execution information fed back by the one or more terminal peripherals; and a second processing component, coupled to the reception component and configured to process the one or more operations to be executed for the one or more terminal peripherals according to the operation execution information.

Figure 8:
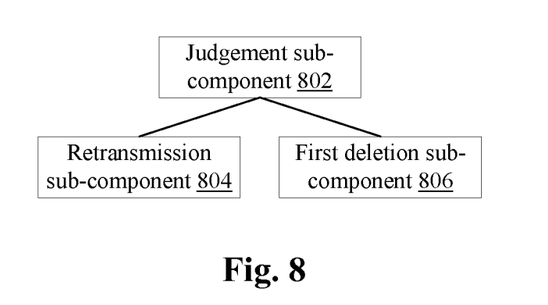
FIG. 8 is an example structural diagram of a second processing component according to an embodiment of the disclosure.

In one embodiment, as shown in FIG. 8, the above-mentioned second processing component includes: a judgement sub-component 802, configured to, in the case that the operation execution information indicates operation execution failure, judge whether the times of executing the one or more operations for the one or more terminal peripherals reach a preset times threshold value and/or whether the duration for storing the one or more operations to be executed for the one or more terminal peripherals in the M2M gateway exceeds a preset valid time value; a retransmission sub-component 804, coupled to the judgement sub-component 802 and configured to, in the case of not reaching the preset times threshold value and not exceeding the preset valid time value, again issue the one or more operations to be executed for the one or more terminal peripherals to the one or more terminal peripherals; and a first deletion sub-component 806, coupled to the judgement sub-component 802 and configured to, in the case of reaching the preset times threshold value and/or exceeding the preset valid time value, delete the stored one or more operations to be executed for the one or more terminal peripherals, and record operation execution information about the one or more operations executed for the one or more terminal peripherals.

In an example embodiment, the above-mentioned second processing sub-component may further include: a second deletion sub-component, configured to, in the case that the operation execution information indicates operation execution success, delete the stored one or more operations to be executed for the one or more terminal peripherals, and record operation execution information about the one or more operations executed for the one or more terminal peripherals.

The embodiments of the disclosure further provide several example embodiments to further explain the disclosure, but it should be noted that the example embodiments are only for better describe the disclosure rather than to limit the disclosure.

Considering that there is no effective mechanism in the related art for performing policy control for one or more terminal peripherals through an M2M gateway, the embodiments of the disclosure provide a policy control method for the one or more terminal peripherals to enable the M2M gateway to implement the policy control for the one or more terminal peripherals. Specifically, the policy control method may be performed according to the following mode.

1) The M2M gateway executes one or more operations for one or more terminal peripherals according to a transaction trigger condition in policy definition. The policy definition may include: a transaction trigger condition and one or more operations for the one or more terminal peripherals, which may be issued by an M2M application or M2M service platform, or also may be locally configured at the M2M gateway.

2) The M2M gateway processes the one or more operations for the one or more terminal peripherals according to the priorities of the one or more operations for the one or more terminal peripherals.

3) The M2M gateway processes the one or more operations for the one or more terminal peripherals according to operation execution information fed by the one or more terminal peripherals. The above-mentioned processing may include various types of processing, e.g., re-execution of the one or more operations for the one or more terminal peripherals, and recording and reporting of an operation execution result.

Example Embodiment 1

Figure 9:
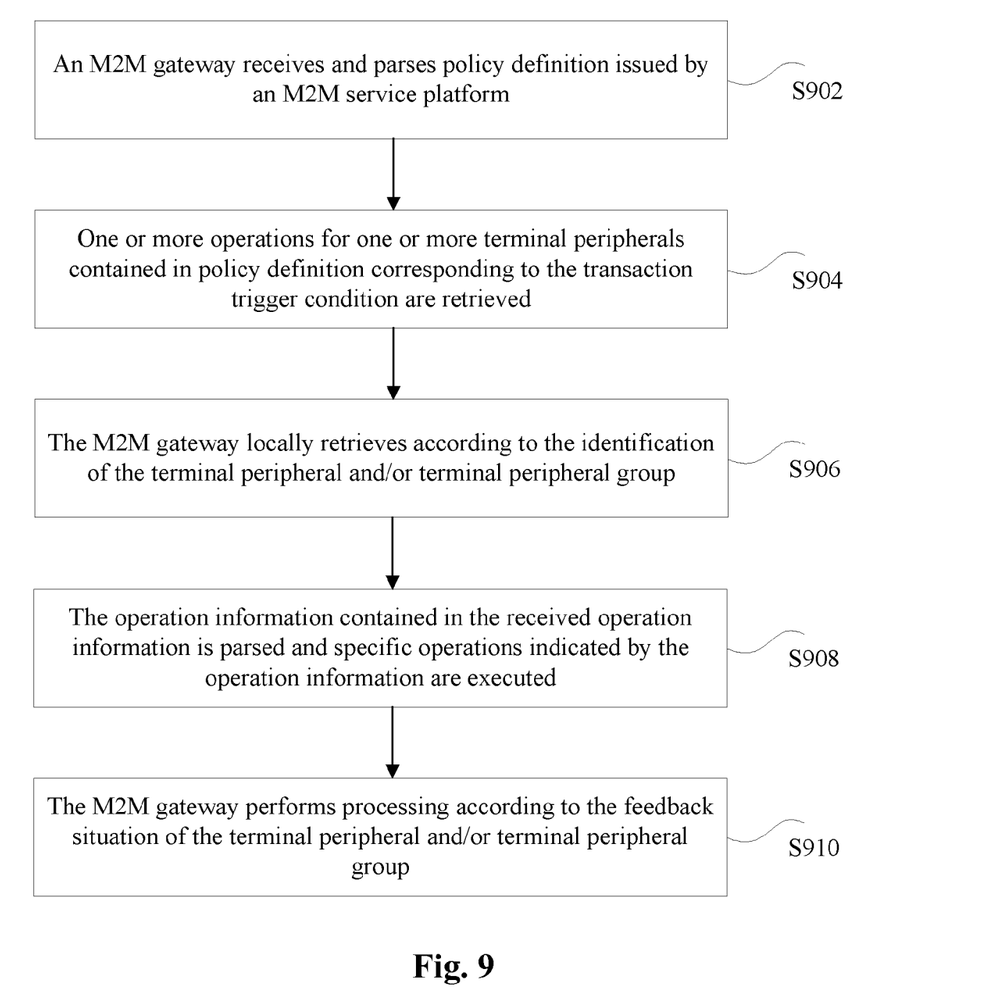
FIG. 9 is an example flowchart of a policy control method for one or more terminal peripherals performed by an M2M gateway according to an embodiment of the disclosure.

As shown in FIG. 9, the method of performing policy control for one or more terminal peripherals by an M2M gateway includes the following Steps S902 to S910.

In Step S902, the M2M gateway receives and parses policy definition issued by an M2M service platform. The above-mentioned policy definition may contain a transaction trigger condition, and one or more operations for the one or more terminal peripherals.

In an example embodiment, the above-mentioned transaction trigger condition means one or more condition values required to be satisfied when the M2M gateway executes the one or more operations for the one or more terminal peripherals. In an example embodiment, the condition value may be a system time of the M2M gateway or a time value of a timer, also may be one or more data values of one or more monitored data items for a terminal peripheral and/or terminal peripheral group, and also may be state values of device running states for the terminal peripheral and/or terminal peripheral group.

The one or more operations for the one or more terminal peripherals may be one or a group of operations for a single terminal peripheral, and also may be a group operation for multiple terminal peripherals or a terminal peripheral group.

In Step S904, when the M2M gateway locally detects that the running state of the terminal peripheral and/or terminal peripheral group satisfies a state value defined by a transaction trigger condition, one or more operations for the one or more terminal peripherals contained in the policy definition corresponding to the transaction trigger condition are retrieved.

The one or more operations for the one or more terminal peripherals may contain: the identification of the terminal peripheral and/or the identification of the terminal peripheral group, operation information and respective priorities of one or more operations, and also may contain a maximal number of times of retransmission and valid time of the one or more operations.

The maximal number of times of retransmission and valid time of the one or more operations may be contained in the above-mentioned one or more operations for the one or more terminal peripherals, and also may be system default values of the M2M gateway.

In Step S906, the M2M gateway locally retrieves whether there is operation information corresponding to the terminal peripheral and/or terminal peripheral group and belonging to the same type as the one or more operations for the one or more terminal peripherals according to the identification of the terminal peripheral and/or the identification of the terminal peripheral group. As an example, the above-mentioned processing may be performed according to the mode described as follows.

1) When there is no operation information belonging to the same type, the M2M gateway stores the one or more operations for the one or more terminal peripherals, issues the one or more operations for the one or more terminal peripherals to corresponding terminal peripheral and/or terminal peripheral group, and sets and starts a timer at the same time.

2) When there is operation information belonging to the same type, the M2M gateway judges whether the priority of the one or more operations for the one or more terminal peripherals is not lower than the priority of the above-mentioned operation information belonging to the same type. When the priority of the one or more operations for the one or more terminal peripherals is not lower than the priority of the above-mentioned operation information belonging to the same type, the M2M gateway uses the one or more operations for the one or more terminal peripherals to replace the operation information, issues the one or more operations for the one or more terminal peripherals to the terminal peripheral and/or terminal peripheral group corresponding to the identification, and restarts the timer at the same time. When the priority of the one or more operations for the one or more terminal peripherals is lower than the priority of the above-mentioned operation information belonging to the same type, the M2M gateway discards the one or more operations for the one or more terminal peripherals.

In Step S908, after receiving the one or more operations for the one or more terminal peripherals issued by the M2M gateway, the terminal peripheral and/or terminal peripheral group parse the operation information contained in the received one or more operations and execute specific operations indicated by the operation information, for example, running states of the terminal peripheral and/or terminal peripheral group may be set according to preset parameter values in the operation information. In addition, the terminal peripheral and/or terminal peripheral group feed the operation execution information back to the M2M gateway.

In an example embodiment, the above-mentioned operation execution information includes: the identification of the terminal peripheral and/or terminal peripheral group, execution success identification and a state value after executing the one or more operations successfully by the terminal peripheral and/or terminal peripheral group, or execution failure indication and a reason value of the failure.

For example, the operation execution information may include two situations as follows.

1) The identification of the terminal peripheral and/or terminal peripheral group+success indication+state value.

2) The identification of the terminal peripheral and/or terminal peripheral group+failure indication+reason value.

In Step S910, the M2M gateway, according to the feedback situation of the terminal peripheral and/or terminal peripheral group, processes according to the following mode.

1) If the operation execution information indicates the one or more operations are executed successfully, then the M2M gateway locally removes operation information about the terminal peripheral and/or terminal peripheral group corresponding to the identification of the terminal peripheral and/or terminal peripheral group, and records operation execution information about the terminal peripheral and/or terminal peripheral group. After all the operations for the one or more terminal peripherals contained in policy definition are executed successfully, the M2M gateway reports to the M2M service platform that the one or more operations for the one or more terminal peripherals are executed successfully.

2) If the operation execution information indicates the one or more operations are executed unsuccessfully, then the M2M gateway retransmits the operation information about the terminal peripheral and/or terminal peripheral group corresponding to the identification of the terminal peripheral and/or terminal peripheral group in the operation execution information according to the maximal number of times of retransmission contained in the one or more operations for the one or more terminal peripherals.

3) If the M2M gateway locally detects that the operation information about the terminal peripheral and/or terminal peripheral group expires or the times of retransmission thereof reaches the maximal number of times, then the M2M gateway locally removes the operation information about the terminal peripheral and/or terminal peripheral group, and records the operation execution information about the terminal peripheral and/or terminal peripheral group. At the same time, the M2M gateway reports to the M2M service platform that the one or more operations for the one or more terminal peripherals are executed unsuccessfully.

Example Embodiment 2

Figure 10:
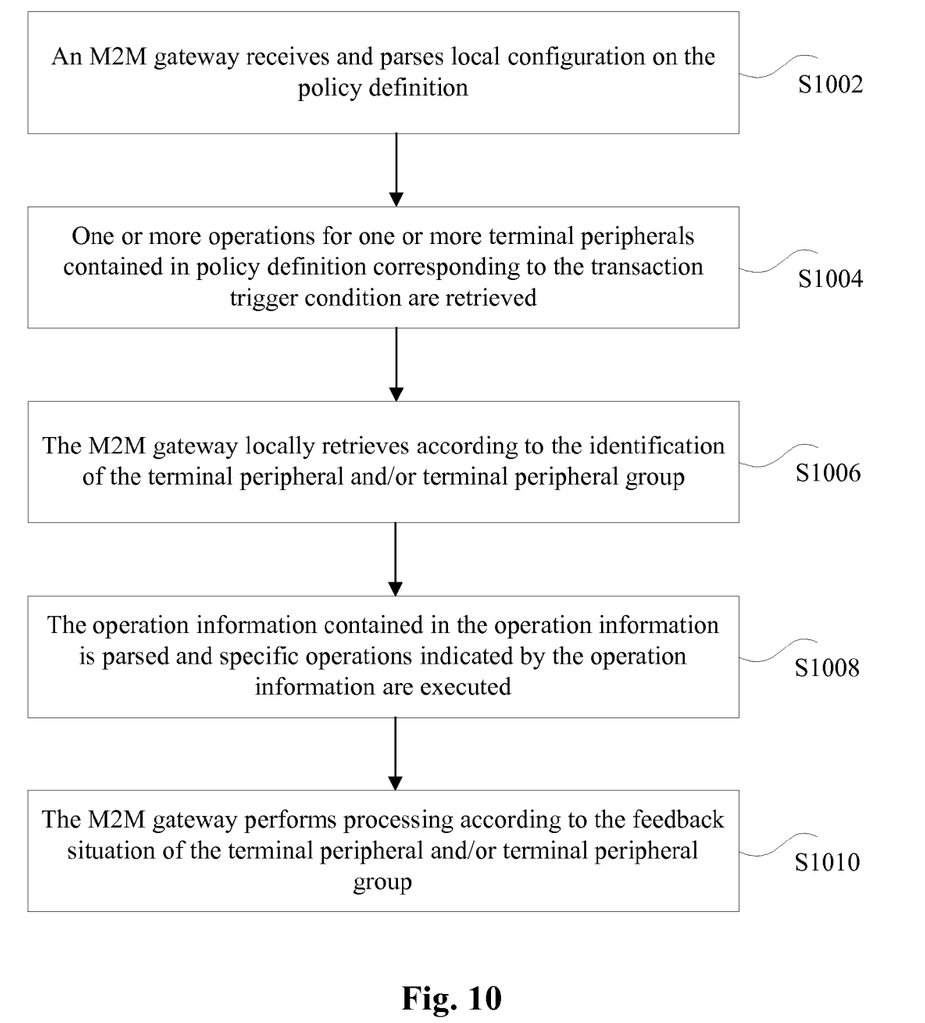
FIG. 10 is another example flowchart of a policy control method for one or more terminal peripherals performed by an M2M gateway according to an embodiment of the disclosure.

As shown in FIG. 10, the method of performing policy control for one or more terminal peripherals by an M2M gateway includes the following Steps S1002 to S1010.

In Step S1002, the M2M gateway receives and parses local configuration for the policy definition. The above-mentioned policy definition may contain a transaction trigger condition, and one or more operations for the one or more terminal peripherals. The above-mentioned local configuration may be set by a user, and also may be preset before leaving factory.

In Step S1004, when the M2M gateway locally detects that the monitored data of the terminal peripheral and/or terminal peripheral group satisfy a data value defined by a transaction trigger condition, one or more operations for one or more terminal peripherals contained in policy definition corresponding to the transaction trigger condition are retrieved. In an example embodiment, the one or more operations for the one or more terminal peripherals may contain: the identification of the terminal peripheral and/or the identification of the terminal peripheral group, operation information and respective priorities of the one or more operations, etc.

In Step S1006, the M2M gateway locally retrieves whether there is operation information corresponding to the terminal peripheral and/or terminal peripheral group and belonging to the same type as the one or more operations for the one or more terminal peripherals according to the identification of the terminal peripheral and/or terminal peripheral group. This processing may be performed according to the following mode.

1) When there is no operation information belonging to the same type, the M2M gateway stores the one or more operations for the one or more terminal peripherals, and issues the one or more operations for the one or more terminal peripherals to corresponding terminal peripheral and/or terminal peripheral group.

2) When there is operation information belonging to the same type, the M2M gateway judges whether the priority of the one or more operations for the one or more terminal peripherals is higher than the priority of the operation information belonging to the same type. When the priority of the one or more operations for the one or more terminal peripherals is higher than the priority of the operation information belonging to the same type, the M2M gateway uses the one or more operations for the one or more terminal peripherals to replace the operation information, issues the one or more operations for the one or more terminal peripherals to the terminal peripheral and/or terminal peripheral group corresponding to the identification. When the priority of the one or more operations for the one or more terminal peripherals is not higher than the priority of the operation information belonging to the same type, the M2M gateway discards the one or more operations for the one or more terminal peripherals.

In Step S1008, after receiving the one or more operations for the one or more terminal peripherals issued by the M2M gateway, the terminal peripheral and/or terminal peripheral group parse the operation information contained in the received one or more operations and execute specific operations indicated by the operation information, for example, corresponding operations of the terminal peripheral and/or terminal peripheral group may be triggered according to preset behaviours in the operation information. In addition, the terminal peripheral and/or terminal peripheral group feed the operation execution information back to the M2M gateway.

In an example embodiment, the above-mentioned operation information includes: the identification of the terminal peripheral and/or terminal peripheral group, execution success indication or execution failure indication.

For example, the operation execution information may include two situations as follows.

1) The identification of the terminal peripheral and/or terminal peripheral group+success indication.

2) The identification of the terminal peripheral and/or terminal peripheral group+failure indication.

In Step S1010, the M2M gateway, according to the feedback situation of the terminal peripheral and/or terminal peripheral group, processes according to the following mode.

1) If the operation execution information indicates the one or more operations are executed successfully, then the M2M gateway locally removes operation information about the terminal peripheral and/or terminal peripheral group corresponding to the identification of the terminal peripheral and/or terminal peripheral group, and records operation execution information about the terminal peripheral and/or terminal peripheral group. After all the operations for the one or more terminal peripherals contained in policy definition are executed successfully, the M2M gateway reports to a user that the one or more operations for the one or more terminal peripherals are executed successfully.

2) If the operation execution information indicates the one or more operations are executed unsuccessfully, then the M2M gateway locally removes operation information about the terminal peripheral and/or terminal peripheral group corresponding to the identification of the terminal peripheral and/or terminal peripheral group, records operation execution information about the terminal peripheral and/or terminal peripheral group. At the same time, the M2M gateway reports to a user that the one or more operations for the one or more terminal peripherals are executed unsuccessfully.

In an example embodiment, the terminal peripheral and/or terminal peripheral group for which the transaction trigger condition is detected by the M2M gateway to be satisfied may be the same as, and also may be different from the terminal peripheral and/or terminal peripheral group for which the one or more operations corresponding to the transaction trigger condition are executed, and this is not limited in the disclosure.

In another embodiment, software is also provided, and the software is used to execute the above-mentioned embodiments or the technical solution described in the example embodiment.

In another embodiment, a storage medium is also provided, wherein the storage medium stores the above-mentioned software, and the storage medium includes but is not limited to an optical disk, a soft disk, a hard disk, an erasable storage, etc.

It can be seen from the above description that the disclosure implements the following technical effects. The M2M gateway executes the one or more operations for the one or more terminal peripherals according to preset policy definition so as to implement policy control for the one or more terminal peripherals. Multiple sets of policy definition may be stored, and each set of policy definition has a transaction trigger condition of the policy, and one or more operations which are to be executed for the one or more terminals when the trigger condition of the policy is satisfied, as well as one or more terminal peripherals the policy definition can be applied. The above-mentioned manner effectively solves the technical problem in the related art that it is impossible to implement control for one or more terminal peripherals through the M2M gateway according to the policy definition, which implements policy control of one or more terminal peripherals through the M2M gateway and improves the intelligent degree of an M2M system.

Apparently, those skilled in the art shall understand that the above components and steps of the disclosure can be implemented by using general purpose calculating device, can be integrated in one calculating device or distributed on a network which consists of a plurality of calculating devices, and alternatively they can be implemented by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. In this way, the disclosure is not restricted to any particular hardware and software combination.

The above description is only example embodiments of the disclosure and is not intended to limit the disclosure, and the disclosure can have a variety of changes and modifications for ordinary person skilled in the field. Any modification, equivalent replacement, or improvement made within the principle of the disclosure shall all fall within the protection scope defined by the appended claims of the disclosure.

What is claimed is:

1. A policy control method for one or more terminal peripherals, comprising: executing, by an machine to machine M2M gateway which is located in M2M system, one or more operations for one or more terminal peripherals according to a transaction trigger condition of policy definition, wherein the one or more operations executed for the one or more terminal peripherals are one or more operations corresponding to the transaction trigger condition in the policy definition;

wherein executing, by the M2M gateway, the one or more operations for the one or more terminal peripherals according to the transaction trigger condition of the policy definition comprises:

when determining currently there are one or more operations belonging to a same type as the one or more operations to be executed for the one or more terminal peripherals; processing, by the M2M gateway, the one or more operations to be executed for the one or more terminal peripherals according to priorities among operations;

wherein processing, by the M2M gateway, the one or more operations to be executed for the one or more terminal peripherals according to the priorities among operations comprises:

in the case that the priority of the one or more operations to be executed for the one or more terminal peripherals is not lower than the priority of the one or more operations belonging to the same type as the one or more operations to be executed for the one or more terminal peripherals, using, by the M2M gateway, the one or more operations to be executed for the one or more terminal peripherals to replace the one or more operations belonging to the same type, otherwise discarding the one or more operations to be executed for the one or more terminal peripherals.

2. The method according to claim 1, wherein the transaction trigger condition is one or more condition values required to be satisfied when the M2M gateway executes the one or more operations for the one or more terminal peripherals, wherein the one or more condition values comprise at least one of the following: a system time of the M2M gateway or a time value of a timer, data values of monitored data of the one or more terminal peripherals, and one or more state values of one or more device operation states of the one or more terminal peripherals.

3. The method according to claim 1, wherein executing the one or more operations for the one or more terminal peripherals comprises:
issuing, by the M2M gateway, the one or more operations to be executed for the one or more terminal peripherals to the one or more terminal peripherals;
receiving, by the M2M gateway, operation execution information fed back by the one or more terminal peripherals; and
processing, by the M2M gateway, according to the operation execution information, the one or more operations to be executed for the one or more terminal peripherals.

4. The method according to claim 3, wherein the operation execution information comprises at least one of the following: terminal peripheral identification, execution success indication, a state value after executing the one or more operations successfully, execution failure indication and a reason value for the operation execution failure.

5. The method according to claim 3, wherein processing, by the M2M gateway, the one or more operations to be executed for the one or more terminal peripherals according to the operation execution information comprises:
in the case that the operation execution information indicates operation execution success, deleting, by the M2M gateway, the stored one or more operations to be executed for the one or more terminal peripherals, and recording, by the M2M gateway, operation execution information about the one or more operations executed for the one or more terminal peripherals.

6. The method according to claim 3, wherein processing, by the M2M gateway, the one or more operations to be executed for the one or more terminal peripherals according to the operation execution information comprises:
in the case that the operation execution information indicates operation execution failure, judging, by the M2M gateway, whether the times of executing the one or more operations for the one or more terminal peripherals reach a preset times threshold value;
if not reached, then again issuing, by the M2M gateway, the one or more operations to be executed for the one or more terminal peripherals to the one or more terminal peripherals, and if reached, then deleting, by the M2M gateway, the stored one or more operations to be executed for the one or more terminal peripherals, and recording, by the M2M gateway, operation execution information about the one or more operations executed for the one or more terminal peripherals.

7. The method according to claim 6, wherein before the M2M gateway again issues the one or more operations to be executed for the one or more terminal peripherals to the one or more terminal peripherals, the method further comprises:
judging, by the M2M gateway, whether the duration for storing the one or more operations to be executed for the one or more terminal peripherals in the M2M gateway exceeds a preset valid time value, if the duration does not exceed the preset valid time value, then again issuing, by the M2M gateway, the one or more operations to be executed for the one or more terminal peripherals to the one or more terminal peripherals.

8. The method according to claim 1, wherein the policy definition is issued to the M2M gateway by an M2M application or M2M service platform, and/or is locally configured at the M2M gateway.

9. The method according to claim 8, wherein
in the case that the policy definition is issued to the M2M gateway by the M2M application or M2M service platform, after executing the one or more operations for the one or more terminal peripherals, the method further comprises: reporting, by the M2M gateway, to the M2M application or M2M service platform, indication information about whether the one or more operations for the one or more terminal peripherals are executed successfully; and/or
in the case that the policy definition is locally configured at the M2M gateway, after executing the one or more operations for the one or more terminal peripherals, the method further comprises: reporting, by the M2M gateway, to a user, indication information about whether the one or more operations for the one or more terminal peripherals are executed successfully.

10. The method according to claim 1, wherein the one or more terminal peripherals are one terminal peripheral or multiple terminal peripherals, and the multiple terminal peripherals constitute a terminal peripheral group.

11. A policy control apparatus of one or more terminal peripherals, wherein the policy control apparatus of the one or more terminal peripherals is located in an machine to machine M2M gateway which is located in M2M system, and comprises: an execution element, configured to execute one or more operations for the one or more terminal peripherals according to a transaction trigger condition in policy definition, wherein the one or more operations executed for the one or more terminal peripherals are one or more operations corresponding to the transaction trigger condition in the policy definition;
wherein the execution element comprises:
a first processing component, configured to, when determining currently there are one or more operations belonging to the same type as the one or more operations to be executed for the one or more terminal peripherals, process the one or more operations to be executed for the one or more terminal peripherals according to priorities among operations; wherein the first processing component is further configured to, in the case that the priority of the one or more operations to be executed for the one or more terminal peripherals is not lower than the priority of the one or more operations belonging to the same type as the one or more operations to be executed for the one or more terminal peripherals, use the one or more operations to be executed for the one or more terminal peripherals to replace the one or more operations belonging to the same type by the M2M gateway, otherwise discard the one or more operations to be executed for the one or more terminal peripherals.

12. The apparatus according to claim 11, wherein the execution element comprises:
a second issuing component, configured to issue the one or more operations to be executed for the one or more terminal peripherals to the one or more terminal peripherals;

a reception component, configured to receive operation execution information fed back by the one or more terminal peripherals; and a second processing component, configured to process the one or more operations to be executed for the one or more terminal peripherals according to the operation execution information.

13. The apparatus according to claim 12, wherein the second processing component comprises:

a judgement sub-component, configured to, in the case that the operation execution information indicates operation execution failure, judge whether the times of executing the one or more operations for the one or more terminal peripherals reach a preset times threshold value and/or whether the duration for storing the one or more operations to be executed for the one or more terminal peripherals in the M2M gateway exceeds a preset valid time value;

a retransmission sub-component, configured to, in the case of not reaching the preset times threshold value and not exceeding the preset valid time value, again issue the one or more operations to be executed for the one or more terminal peripherals to the one or more terminal peripherals; and a first deletion sub-component, configured to, in the case of reaching the preset times threshold value and/or exceeding the preset valid time value, delete the stored one or more operations to be executed for the one or more terminal peripherals, and record operation execution information about the one or more operations executed for the one or more terminal peripherals.

14. The apparatus according to claim 12, wherein the second processing component comprises:

a second deletion sub-component, configured to, in the case that the operation execution information indicates operation execution success, delete the stored one or more operations to be executed for the one or more terminal peripherals, and record operation execution information about the one or more operations executed for the one or more terminal peripherals.

* * * * *